US009689468B2

(12) United States Patent
Beck et al.

(10) Patent No.: US 9,689,468 B2
(45) Date of Patent: Jun. 27, 2017

(54) MULTI-SPEED TRANSMISSION IN PLANETARY DESIGN

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/769,575

(22) PCT Filed: Jan. 22, 2014

(86) PCT No.: PCT/EP2014/051175
§ 371 (c)(1),
(2) Date: Aug. 21, 2015

(87) PCT Pub. No.: WO2014/127946
PCT Pub. Date: Aug. 28, 2014

(65) Prior Publication Data
US 2016/0003328 A1      Jan. 7, 2016

(30) Foreign Application Priority Data

Feb. 22, 2013   (DE) .................. 10 2013 202 885

(51) Int. Cl.
*F16H 3/66*   (2006.01)
*F16H 3/44*   (2006.01)

(52) U.S. Cl.
CPC ......... *F16H 3/66* (2013.01); *F16H 2003/442* (2013.01); *F16H 2003/445* (2013.01);
(Continued)

(58) Field of Classification Search
CPC ...... F16H 3/66; F16H 3/666; F16H 2003/442; F16H 2003/445; F16H 2200/0065; F16H 2200/2046; F16H 2200/201
See application file for complete search history.

(56) References Cited

U.S. PATENT DOCUMENTS 7,819,772 B2   10/2010   Tenberge
2009/0098974 A1   4/2009   Phillips
(Continued)

FOREIGN PATENT DOCUMENTS

JP   2010-286092   12/2010
JP   2011-017424   1/2011
(Continued)

OTHER PUBLICATIONS

PCT Search Report, May 8, 2014.
PCT Search Report and Written Opinion, May 8, 2014.
German Patent Office Search Report, Oct. 31, 2013.

*Primary Examiner* — Jacob S Scott
(74) *Attorney, Agent, or Firm* — Dority & Manning, P.A.

(57) ABSTRACT

A multi-speed transmission in planetary design is proposed for a vehicle. A first shaft is provided as a drive (An) and a second shaft is provided as an output (Ab) arranged axially parallel to the drive. Three planetary gear sets (RS1, RS2, RS3) and additional shafts along with six shifting elements (K1, K2, K3, K4, B1, B2) are provided, through which actuation of several gears is realized. Machine elements (ST1, ST2) are provided for transfer of torque between the drive (An) and the output (Ab). The first shaft is connected or connectable, as a drive, the ring gear (HR3) of the third planetary gear set (RS3) and to the planetary gear carrier (PT2) of the second planetary gear set (RS2). The second shaft (2), as an output shaft (Ab), is connectable or connected to the first machine element (ST1) and to the second machine element (ST2).

34 Claims, 10 Drawing Sheets

(52) U.S. Cl.
CPC ............... *F16H 2200/0065* (2013.01); *F16H 2200/201* (2013.01); *F16H 2200/2046* (2013.01)

(56) References Cited

U.S. PATENT DOCUMENTS

| | | |
|---|---|---|
| 2010/0035718 A1 | 2/2010 | Saitoh |
| 2010/0311534 A1 | 12/2010 | Sugino |
| 2015/0087469 A1 | 3/2015 | Beck |

FOREIGN PATENT DOCUMENTS

| | | |
|---|---|---|
| JP | 2012-127398 | 7/2012 |
| JP | 2012-127399 | 7/2012 |

| Gang (gear) | geschlossene Schaltelemente (engaged shifting elements) ||||||  Über-setzung (ratio) | Gang-sprung (step) |
|---|---|---|---|---|---|---|---|---|
| | Bremse (brake) || Kupplung (clutch) ||||||
| | B1 | B2 | K1 | K2 | K3 | K4 | i | φ |
| G1 |   | X |   | X |   | X | 4,448 | 1,698 |
| G2 | X |   |   | X |   | X | 2,619 | 1,572 |
| G3 |   |   | X | X |   | X | 1,667 | 1,332 |
| G4 |   |   |   | X | X | X | 1,252 | 1,252 |
| G5 |   |   | X | X | X |   | 1,000 | 1,220 |
| G6 | X |   |   | X | X |   | 0,891 | 1,130 |
| G7 |   | X |   | X | X |   | 0,725 | 1,165 |
| G8 | X | X |   |   | X |   | 0,623 | 1,197 |
| G9 |   | X | X |   | X |   | 0,520 | Gesamt (total) 8,548 |
| R |   | X | X |   |   | X | -3,200 | |
| M1 |   | X |   |   | X | X | 1,252 ||
| M2 |   |   | X |   | X | X | 1,252 ||
| M3 | X |   |   |   | X | X | 1,252 ||

Fig. 6

MULTI-SPEED TRANSMISSION IN PLANETARY DESIGN

FIELD OF THE INVENTION

The present invention relates to a multi-speed transmission in planetary design for a vehicle.

As an example, publication DE 10 2007 014 150 A1 discloses a load-shiftable multi-speed transmission. With the multi-speed transmission, the drive shaft is firmly connected through a torsional vibration damper to a first shaft of a first shaft train. A second shaft train arranged parallel to this includes, among other things, the two output shafts designated as shafts. The two shaft trains are connected to each other through three spur gear stages. A first three-shaft planetary gear stage is located on the first shaft train. A second planetary gear stage and a third planetary gear stage are located on the second shaft train. Thus, the multi-speed transmission comprises ten shafts that are connected to each other through three spur gear stages and three planetary gear stages. For shifting the eight forward gears and one reverse gear, five shifting elements are necessary. The provided shifting elements are hydraulically operated.

In order to reduce hydraulic losses, the shifting elements are to be arranged in a manner that is easily accessible from the outside. However, with a front-transverse installation of the transmission in a vehicle, only a limited axial installation space is available.

SUMMARY OF THE INVENTION

The present invention is subject to a task of providing a multi-speed transmission with the highest possible number of gears and an easy accessibility of the shifting elements, with, at the same time, a good gearing efficiency and a need for axial installation space that is as low as possible. Additional objects and advantages of the invention will be set forth in part in the following description, or may be obvious from the description, or may be learned through practice of the invention.

The tasks are solved by the characteristics of the transmission embodiments set forth herein.

Accordingly, a load-shiftable multi-speed transmission in planetary design, or a multiple-gear planetary transmission for a vehicle with a housing, is proposed, whereas the drive or the drive shaft, as the case may be, and the output or the output shaft, as the case may be, are arranged in a manner that is axially parallel to each other for a preferred front-transverse installation. The multi-speed transmission in accordance with the invention comprises only nine shafts, three planetary gear sets and only six shifting elements, in order to realize at least nine forward gears and one reverse gear. In addition, for the coupling of the drive and the output, it is preferable that only two machine elements are provided.

Given the fact that the first shaft, as a drive, is detachably connected, or connectable or connected, at least to the ring gear of the third planetary gear set and to the planetary gear carrier of the second planetary gear set and that the second shaft, as an output, is detachably connected, or is connected or connectable, to the first machine element and to the second machine element, a multi-speed transmission in accordance with the invention that enables an actuation of the shifting elements that improves the degree of efficiency and is thus in line with demand arises, whereas the advantageously low number of transmission elements of the multi-speed transmission for a front-transverse design has its transmission elements nested with each other in such a manner that an arrangement that particularly saves axial installation space is enabled. In addition to the improved degree of efficiency, low component stresses and low construction costs arise.

The easy accessibility of the shifting elements may be realized, among other things, on the one hand through the use of brakes as shifting elements and, on the other hand, through the use of clutches as shifting elements, which are preferentially positioned at outside shafts, preferably at the drive and at the output, with the multi-stage transmission in accordance with the invention. Due to the low construction costs, in an advantageous manner, low production costs and a low weight of the multi-speed transmission in accordance with the invention arise.

Within the framework of a possible embodiment of the invention, it can be provided that, as a machine element for the coupling or for the transfer of torque between the drive and the output, at least one spur gear stage or the like, which realizes the transmission ratio for the output differential, is used. Preferably, only two machine elements or spur gear stages are provided. However, other machine elements for the transmission of power, such as chains, belts or the like, may be used.

Viewed in an axial direction, the planetary gear sets are arranged in the order of first planetary gear set, second planetary gear set, and third planetary gear set, whereas it is preferable that three negative planetary gear sets are provided. However, individual or several negative planetary gear sets may be converted into positive planetary gear sets, if, at the same time, the bar connection or planetary gear carrier connection and the ring gear connection are exchanged, and the amount of the stationary transmission ratio is increased by the value of 1. As is well-known, a negative planetary gear set features, at the planetary gear carrier, rotatably mounted planetary gears, which mesh with the sun gear and the ring gear of such planetary gear set, such that, with a planetary gear carrier that is held down and a rotating sun gear, the ring gear rotates in a direction opposite to the direction of rotation of the sun gear. As is well-known, a positive planetary gear set features, at its planetary gear carrier, inner and outer planetary gears that are rotatably mounted and are in a tooth meshing with each other, whereas the sun gear of such planetary gear set meshes with the inner planetary gears, and the ring gear of such planetary gear set meshes with the outer planetary gears, such that, with a planetary gear carrier that is held down and a rotating sun gear, the ring gear rotates in the same direction as the direction of rotation of the sun gear.

Within the framework of a particular embodiment of the invention, it can be provided that several of the planetary gear sets are arranged radially one above the other. For the coupling of the nested planetary gear sets, for example, the ring gear of the inner planetary gear set and the sun gear of the outer planetary gear set are designed as one component. For this purpose, for example, the ring gear of the inner planetary gear set features an inner toothing and an outer toothing, but other designs are conceivable. Regardless of the type of coupling, the planetary gear sets that are nested in one another are essentially arranged in one axial plane, such that, in an advantageous manner, axial installation space is saved.

With the multi-speed transmission in accordance with the invention, a hydrodynamic torque converter or a hydrodynamic clutch can be used as the start-up element. It is also conceivable that an additional start-up clutch or an integrated start-up clutch or a start-up brake are used. Furthermore, it is possible that an electric machine or any other power source is arranged at at least one of the shafts. Moreover, at at least one of the shafts, a freewheel is arranged for the housing or for another shaft.

Preferably, with the multi-speed transmission in accordance with the invention, nine forward gears and at least one reverse gear can be shifted by means of the provided shifting elements. However, it is conceivable that, for the fourth forward gear (for example), additional shifting combinations are made possible by combining other shifting elements.

Under term "shifting element," a shiftable connection between two elements of the transmission is understood, whereas the torque to be transferred between such two elements is transferred by means of the force closure or frictional closure or by means of the form closure. If both elements of the shiftable connection are designed to rotate, the shifting element is referred to as a clutch, and if only one of the two elements of the shiftable connection rotates, the shifting element is referred to as a brake. Moreover, the geometric position and/or order of the individual shifting elements can be freely selected. In this manner, individual elements may be arbitrarily moved into any position. In addition, to the extent permitted by the external shape, several gear sets can be arranged radially above one another, thus in a nested manner.

Embodiments of a force-fitting shifting element include multi-disk clutches or brakes, band brakes, cone clutches or brakes, electromagnetic clutches, magnetic powder clutches and electro-rheological clutches. Embodiments of a positive-locking shifting element include claw clutches or brakes and tooth clutches.

Thus, in general, both frictional-locking and positive-locking shifting elements may be used as shifting elements. Preferably, given their characteristics, in particular the second shifting element designed as a clutch and the fourth shifting element designed as a clutch can be designed as claw shifting elements, by which significant consumption advantages can be achieved.

BRIEF DESCRIPTION OF THE DRAWINGS

In the following, the present invention is explained in more detail based on the drawing. The following is shown:

FIG. 6 is a shifting diagram for the various design variants of the multi-speed transmission specified above.

DETAILED DESCRIPTION

Figure 1:
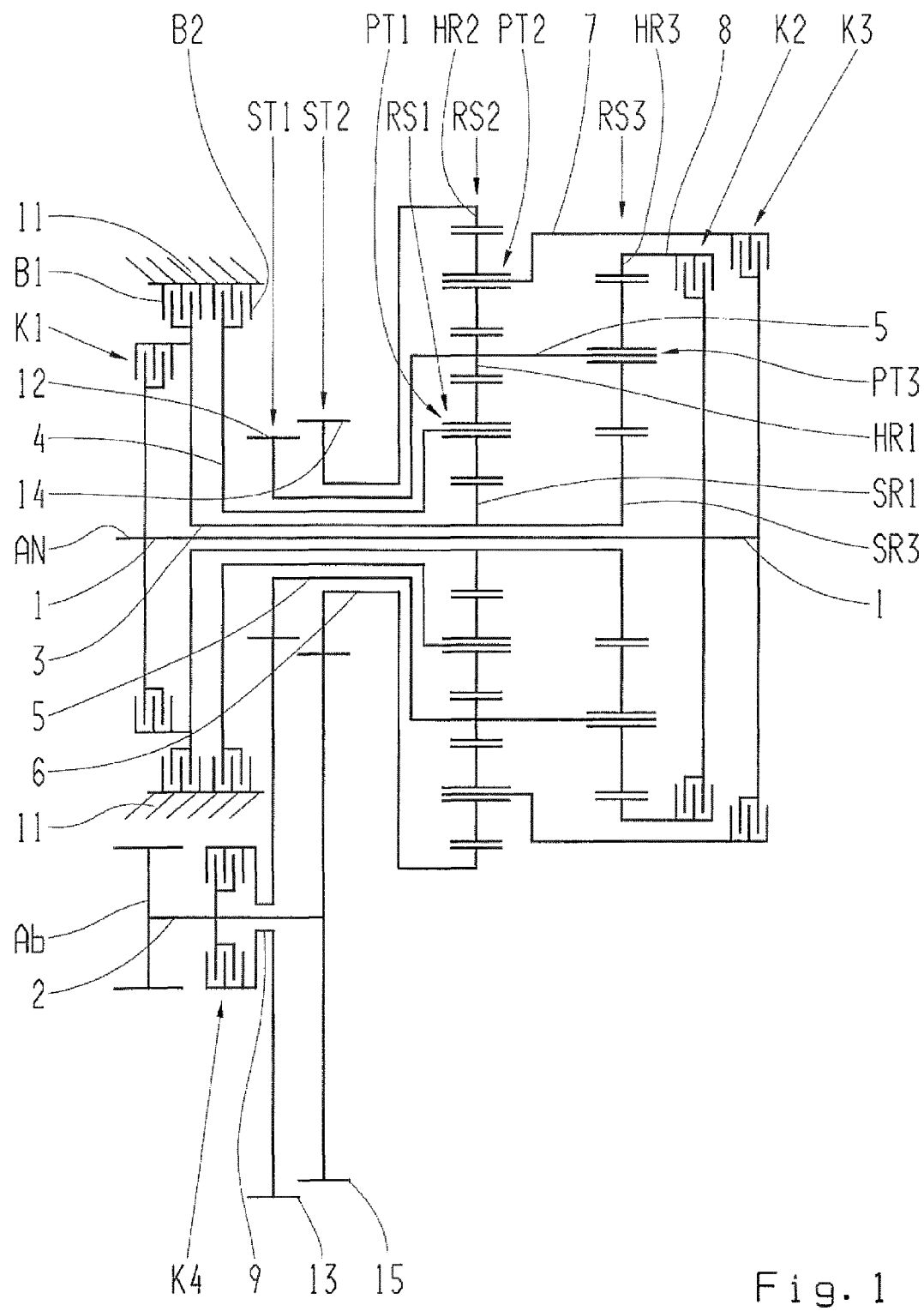
FIG. 1 is a schematic view of a first design variant of a multi-speed transmission in accordance with the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Each of FIGS. 1 to 5 shows an example of a design variant of the multi-speed transmission in planetary design in accordance with the invention, for example as an automatic gearbox or automatic transmission for a vehicle, whereas FIG. 6 indicates an example of a shifting diagram for the shown design variants of the multi-speed transmission.

Regardless of the particular design variants, the multi-speed transmission comprises a merely schematically indicated housing 11, with a first shaft 1 as a drive An and a second shaft 2 as an output Ab that is arranged in a manner axially parallel to the drive, along with seven additional shafts 3, 4, 5, 6, 7, 8, 9. Furthermore, a first planetary gear set RS1, a second planetary gear set RS2 and a third planetary gear set RS3 are provided, whereas each of the first planetary gear set RS1, the second planetary gear set RS2 and the third planetary gear RS3 is preferably designed as a negative planetary gear set. For shifting several gears, a first shifting element K1 designed as a clutch, a second shifting element K2 designed as a clutch, a third shifting element K3 designed as a clutch, a fourth shifting element K4 designed as a clutch, a fifth shifting element B1 designed as a brake, and a sixth shifting element B2 designed as a brake are provided. For the coupling or for the transfer of torque between the drive An and the output Ab, two arbitrary machine elements are preferably provided; with the design variants, these are designed, for example, as a first spur gear stage ST1 and a second spur gear stage ST2.

Figure 2:
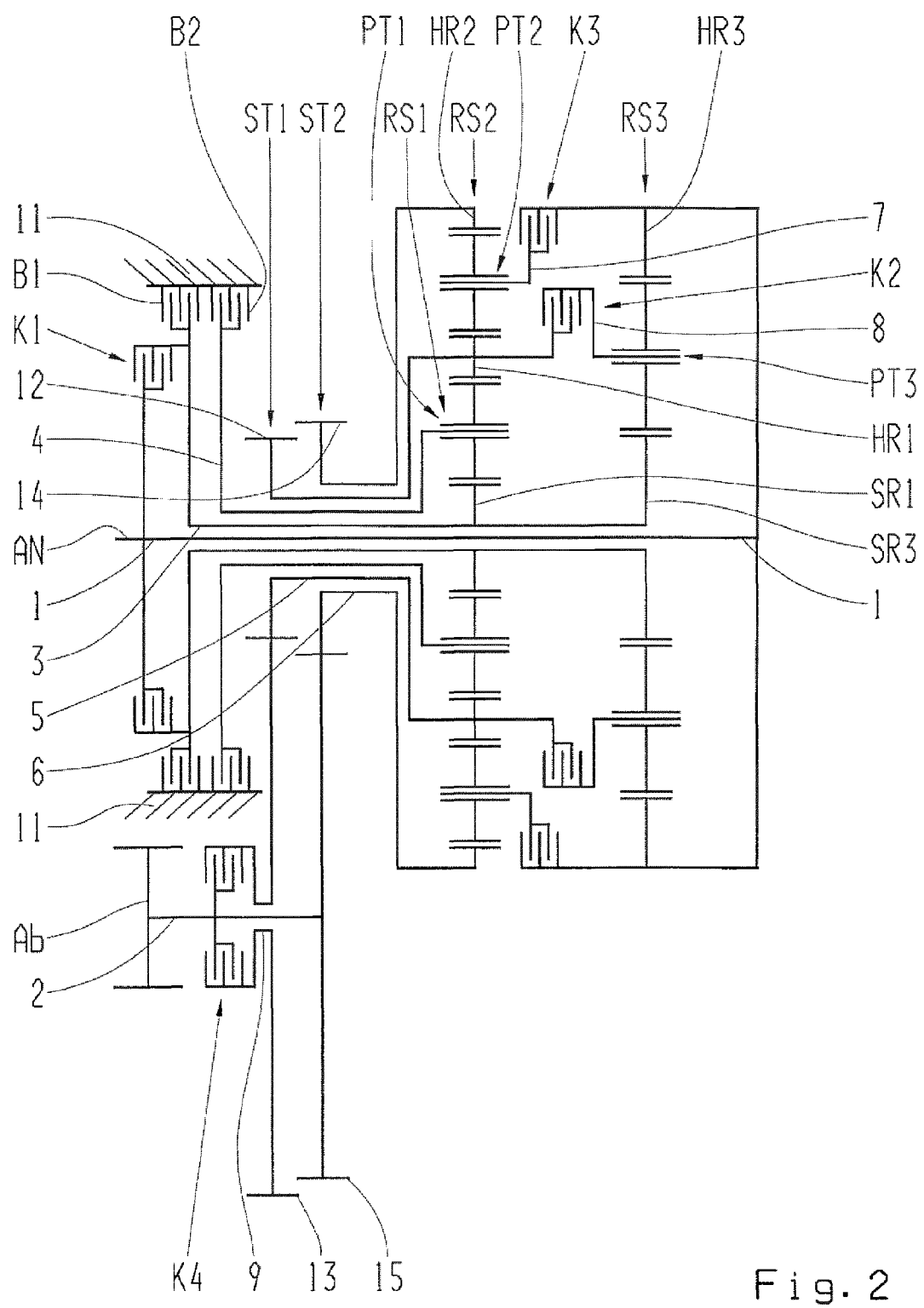
FIG. 2 is a schematic view of a second design variant of the multi-speed transmission.
Figure 3:
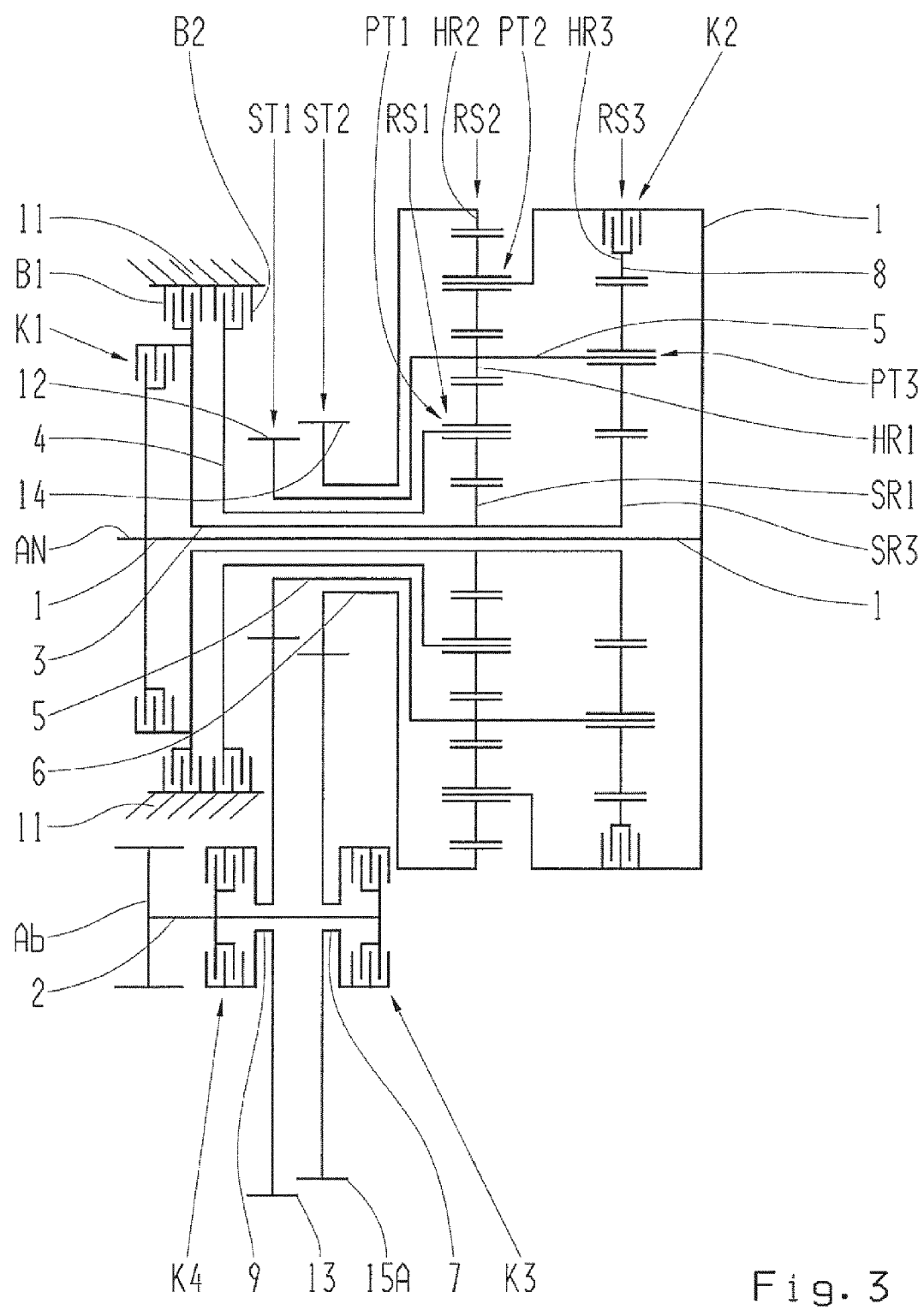
FIG. 3 is a schematic view of a third design variant of the multi-speed transmission.
Figure 4:
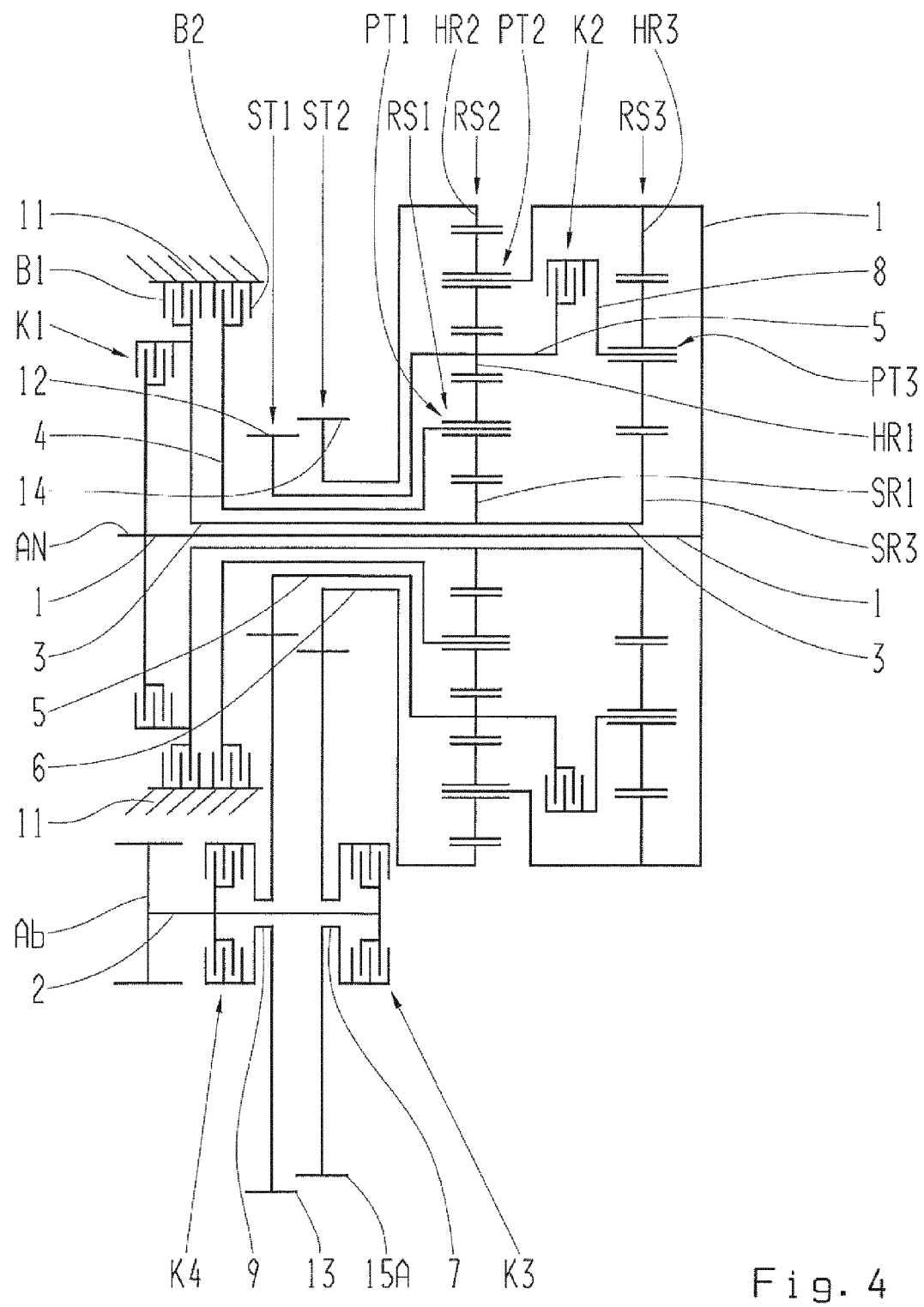
FIG. 4 is a schematic view of a fourth design variant of the multi-speed transmission.
Figure 5:
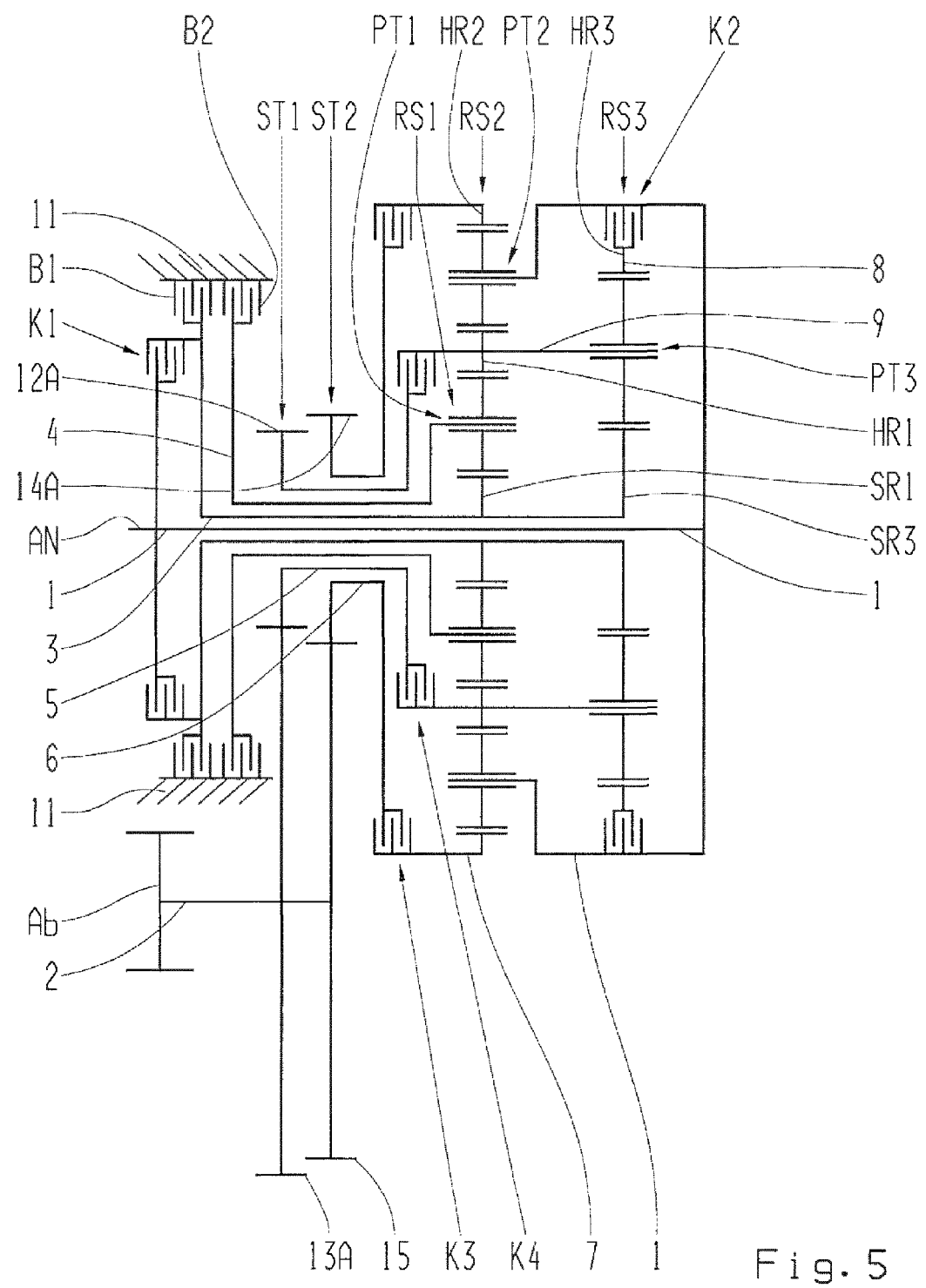
FIG. 5 is a schematic view of an alternative design of the third design variant of the multi-speed transmission.

In relation to the design variant in accordance with FIG. 1, FIGS. 2 to 5 show transmission variants with the same effect, whereas FIG. 5 shows a possible variation of the third design variant in accordance with FIG. 3, with which the shifting elements K3 and K4 allocated to the spur gear stages ST1 and ST2 are shifted from the output shaft or intermediate shaft, as the case may be, to the main shaft or the drive shaft, as the case may be. The different design variants in accordance with FIGS. 1 to 5 do not functionally differ from the design variants in accordance with FIG. 1 with respect to degree of efficiency, grading, etc.

With respect to the connection options between the provided shafts 1, 2, 3, 4, 5, 6, 7, 8, 9, the provided three planetary gear sets RS1, RS2, RS3, the provided housing 11 and the provided shifting elements K1, K2, K3, K4, B1, B2 along with the provided spur gear stages ST1, ST2, with the term "connectable, it is to be understood that the described elements are detachable (for example, connected by a shifting element), such that the connection is locked with an activated shifting element and open with a non-activated shifting element. The detachable connection may be realized through, in addition to the shifting element, an additional element such as a shaft or the like. With the term "connected," it is to be understood that the described elements are connected to each other in a manner that is virtually fixed, thus not detachable. A direct or indirect connection (for example, through additional elements) may be realized.

In accordance with the invention, it is provided with the multi-speed transmission that the first shaft 1 is detachably connected, or connectable or connected, as a drive, at least to the ring gear HR3 of the third planetary gear set RS3 and to the planetary gear carrier PT2 of the second planetary gear set RS2. Depending on the design variant, the second shaft is detachably connected, or connected or connectable, as output Ab, to the first machine element or to the first spur gear stage ST1, as the case may be, and to the second machine element or the second spur gear stage ST2, as the case may be.

Regardless of the particular design variants, it is provided with all design variants that two of the three planetary gear sets RS1, RS2, RS3 are arranged radially one above the other, and thus lie essentially in one common axial plane. For this purpose, the first planetary gear set RS1 is arranged radially inwardly and the second planetary gear set RS2 is arranged radially outwardly, whereas the ring gear HR1 of the first planetary gear set RS1 serves as the connecting link between the two planetary gear sets RS1 and RS2. At the same time, the ring gear HR of a first planetary gear set RS1 is the sun gear of the second planetary gear set RS2.

With the first design variant in accordance with FIG. 1, it is provided with the multi-speed transmission in accordance with the invention that the first shaft 1 is connectable through the first shifting element K1 designed as a clutch and through the third shaft 3 to the sun gear SR1 of the first planetary gear set RS1 and the sun gear SR3 of the third planetary gear set RS3, whereas the sun gear SR1 of the first planetary gear set RS1 and the sun gear SR3 of the third planetary gear set RS3 are connectable through the third shaft 3 and through the fifth shifting element B1 designed as a brake to the housing 11. Furthermore, the first shaft 1 is connectable through the second shifting element K2 designed as a clutch and through the eighth shaft 8 to the ring gear HR3 of the third planetary gear set RS3. In addition, the first shaft 1 is connectable through the third shifting element K3 designed as a clutch and through the seventh shaft 7 to the planetary gear carrier PT2 of the second planetary gear set RS2. Moreover, the second shaft 2 is connectable through the fourth shifting element K4 designed as a clutch and through the ninth shaft 9 to the idler gear 13 of the first spur gear stage ST1, and the second shaft 2 is connected to the fixed gear 15 (fixed to a shaft) of the second spur gear stage ST2.

Furthermore, with the first design variant, the planetary gear carrier PT1 of the first planetary gear set RS1 is connectable through the fourth shaft 4 and through the sixth shifting element B2 designed as a brake to the housing 11, and the fixed gear 12 of the first spur gear stage ST1 is connected through the fifth shaft 5 to the ring gear HR1 of the first planetary gear set RS1 and to the planetary gear carrier PT3 of the third planetary gear set RS3. Finally, the fixed gear 14 (fixed to a shaft) of the second spur gear stage ST2 is connected through the sixth shaft 6 to the ring gear HR2 of the second planetary gear set RS2.

With the second design variant in accordance with FIG. 2, it is provided that the first shaft 1 is connectable through the first shifting element K1 designed as a clutch and through the third shaft 3 to the sun gear SR1 of the first planetary gear set RS1 and to the sun gear SR3 of the third planetary gear set RS3, whereas the sun gear SR1 of the first planetary gear set RS1 and the sun gear SR3 of the third planetary gear set SR3 are connectable through the third shaft 3 and through the fifth shifting element B1 designed as a brake to the housing 11. Furthermore, the first shaft 1 is connected to the ring gear HR3 of the third planetary gear set RS3. In addition, the first shaft 1 is connectable through the third shifting element K3 designed as a clutch and through the seventh shaft 7 to the planetary gear carrier PT2 of the second planetary gear set RS2. The second shaft 2 is connectable through the fourth shifting element K4 designed as a clutch and through the ninth shaft 9 to the idler gear 13 of the first spur gear stage ST1. Furthermore, the second shaft 2 is connected to the fixed gear 15 of the second spur gear stage ST2.

Moreover, with the second design variant, the planetary gear carrier PT1 of the first planetary gear set RS1 is connectable through the fourth shaft 4 and through the sixth shifting element B2 designed as a brake to the housing 11. In addition, the fixed gear 12 of the first spur gear stage ST1 is connected through the fifth shaft 5 to the ring gear HR1 of the first planetary gear set RS1, whereas the fixed gear 12 of the first spur gear stage ST1 and the ring gear HR1 of the first planetary gear set RS1 are connectable through the fifth shaft 5 and through the second shifting element K2 designed as a clutch, and through the eighth shaft 8, to the planetary gear carrier PT3 of the third planetary gear set RS3. Finally, the fixed gear 14 of the second spur gear stage ST2 is connected through the sixth shaft 6 to the ring gear HR2 of the second planetary gear set RS2.

Figure 2A:
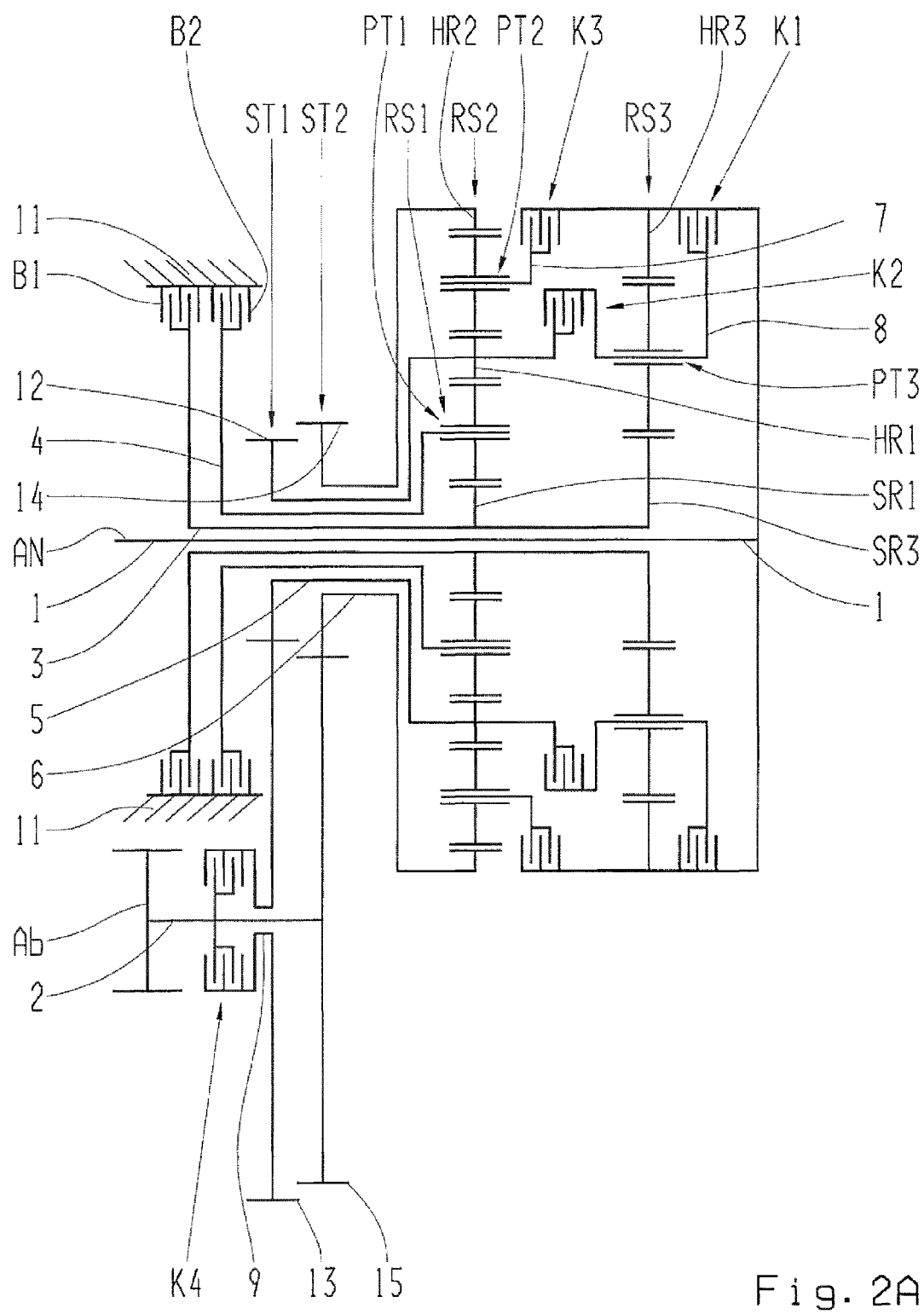
FIG. 2A is a schematic view of a first blocking variant for the second design variant in accordance with FIG. 2.

FIG. 2A shows a first blocking variant for the second design variant of the multi-speed transmission in accordance with the invention shown in FIG. 2. With the variant shown in FIG. 2, for the blocking of the third planetary gear set RS3, the ring gear HR3 is connected to the sun gear SR3 of the third planetary gear set RS3 through the first shifting element K1 designed as a clutch. By contrast, with the variant in accordance with FIG. 2A, the ring gear HR3 is connected through the first shifting element K1 to the planetary gear carrier PT3 or the bar of the third planetary gear set RS3.

Specifically, it is provided with the variant shown in FIG. 2A that the first shaft 1 is connected to the ring gear HR3 of the third planetary gear set RS3, that the first shaft 1 is connectable through the first shifting element K1 designed as a clutch and through the eighth shaft 8 to the planetary gear carrier PT3 of the third planetary gear set RS3, that the first shaft 1 is connectable through the third shifting element K3 designed as a clutch and through the seventh shaft 7 to the planetary gear carrier PT2 of the second planetary gear set RS2, that the second shaft 2 is connectable through the fourth shifting element K4 designed as a clutch and through the ninth shaft 9 to the idler gear 13 of the first spur gear stage ST1 and that the second shaft 2 is connected to the fixed gear 15 of the second spur gear stage ST2.

In addition, it is provided with the variant shown in FIG. 2A that the sun gear SR1 of the first planetary gear set RS1 and the sun gear SR3 of the third planetary gear set RS3 are connectable through the third shaft 3 and the fifth shifting element B1 designed as a brake to the housing 11. Furthermore, the planetary gear carrier PT1 of the first planetary gear set RS1 is connectable through the fourth shaft 4 and through the sixth shifting element B2 designed as a brake to the housing 11. In addition, the fixed gear 12 of the first spur gear stage ST1 is connected through the fifth shaft 5 to the ring gear HR1 of the first planetary gear set RS1, whereas the fixed gear 12 of the first spur gear stage ST1 and the ring gear HR1 of the first planetary gear set RS1 are connectable through the fifth shaft 5 and through the second shifting element K2 designed as a clutch, and through the eighth shaft 8, to the planetary gear carrier PT3. Finally, the fixed gear 14 of the second spur gear stage ST2 is connected through the sixth shaft 6 to the ring gear HR2 of the second planetary gear set RS2.

Figure 2B:
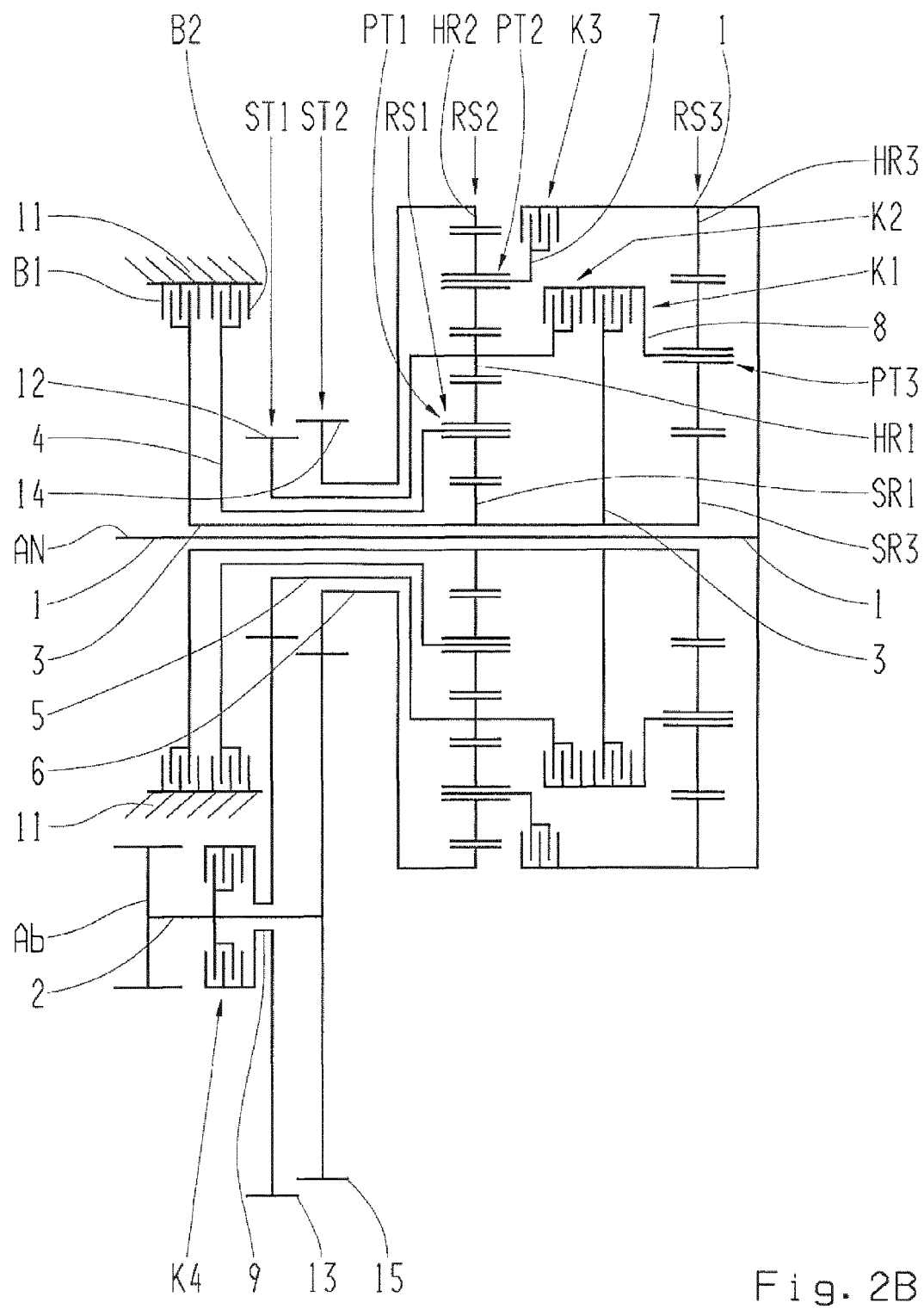
FIG. 2B is a schematic view of a second blocking variant for the second design variant in accordance with FIG. 2.

FIG. 2B shows a second blocking variant in respect of the second design variant of the multi-speed transmission. With the second blocking variant, through the first shifting element K1 designed as a clutch, the planetary gear carrier PT3 and the sun gear SR3 of the third planetary gear set RS3 are connected to each other. Specifically, it is provided that the first shaft 1 is connected to the ring gear HR3 of the third planetary gear set RS3. Furthermore, the first shaft 1 is connectable through the third shifting element K3 designed as a clutch and through the seventh shaft 7 to the planetary gear carrier PT2 of the second planetary gear set RS2. In addition, the second shaft 2 is connectable through the fourth shifting element K4 designed as a clutch and through the ninth shaft 9 to the idler gear 13 of the first spur gear stage ST1. Moreover, the second shaft 2 is connected to the fixed gear 15 of the second spur gear stage ST2.

Furthermore, with the second blocking variant, the sun gear SR1 of the first planetary gear set RS1 and the sun gear SR3 of the third planetary gear set RS3 are connectable through the third shaft 3 and through the fifth shifting element B1 designed as a brake to the housing 11, whereas the sun gear SR1 of the first planetary gear set RS1 and the sun gear SR3 of the third planetary gear set RS3 are connectable through the third shaft 3 and through the first shifting element K1 designed as a clutch, and through the eighth shaft 8, to the planetary gear carrier PT3 of the third planetary gear set RS3 and whereas the sun gear SR1 of the first planetary gear set RS1 and the sun gear SR3 of the third planetary gear set RS3 are connectable through the third shaft 3 and through the first shifting element K1 designed as a clutch, and through the eighth shaft 8 and through the second shifting element K2 designed as a clutch, and through the fifth shaft 5, to the ring gear HR1 of the first planetary gear set RS1. In addition, the planetary gear carrier PT1 of the first planetary gear set RS1 is connectable through the fourth shaft 4 and through the sixth shifting element B2 designed as a brake to the housing 11. The fixed gear 12 of the first spur gear stage ST1 is connectable through the fifth shaft 5 to the ring gear HR1 of the first planetary gear set RS1. Finally, the fixed gear 14 of the second spur gear stage ST2 is connected through the sixth shaft 6 to the ring gear HR2 of the second planetary gear set RS2.

With the third design variant in accordance with FIG. 3, it is provided that the first shaft 1 is connectable through the first shifting element K1 designed as a clutch and through the third shaft 3 to the sun gear SR1 of the first planetary gear set RS1 and the sun gear SR3 of the third planetary gear set RS3, whereas the sun gear SR1 of the first planetary gear set RS1 and the sun gear SR3 of the third planetary gear set RS3 are connectable through the third shaft 3 and through the fifth shifting element B1 designed as a brake to the housing 11. Furthermore, the first shaft 1 is connected to the planetary gear carrier PT2 of the second planetary gear set RS2. The first shaft 1 is connectable through the second shifting element K2 designed as a clutch and through the eighth shaft 8 to the ring gear HR3 of the third planetary gear set RS3. In addition, the second shaft 2 is connectable through the fourth shifting element K4 designed as a clutch and through the ninth shaft 9 to the idler gear 13 of the first spur gear stage ST1. The second shaft 2 is connectable through the third shifting element K3 designed as a clutch and through the seventh shaft 7 to the idler gear 15A of the second spur gear stage ST2.

Moreover, with the third design variant, the planetary gear carrier PT1 of the first planetary gear set RS1 is connectable through the fourth shaft 4 and through the sixth shifting element B2 designed as a brake to the housing 11. The fixed gear 12 of the first spur gear stage ST1 is connected through the fifth shaft 5 to the ring gear HR1 of the first planetary gear set RS1 and to the planetary gear carrier PT3 of the third planetary gear set RS3. Furthermore, the fixed gear 14 of the second spur gear stage ST2 is connected through the sixth shaft 6 to the ring gear HR2 of the second planetary gear set RS2.

In accordance with FIG. 4, it is provided with the fourth design variant that the first shaft 1 is connectable through the first shifting element K1 designed as a clutch and through the third shaft 3 to the sun gear SR1 of the first planetary gear set RS1 and to the sun gear SR3 of the third planetary gear set RS3, whereas the sun gear SR1 of the first planetary gear set RS1 and the sun gear SR3 of the third planetary gear set RS3 are connectable through the third shaft 3 and through the fifth shifting element B1 designed as a brake to the housing 11. The first shaft 1 is connected to the ring gear HR3 of the third planetary gear set RS3 and to the planetary gear carrier PT2 of the second planetary gear set RS2. In addition, the second shaft 2 is connectable through the fourth shifting element K4 designed as a clutch and through the ninth shaft 9 to the idler gear 13 of the first spur gear stage ST1.

The second shaft 2 is connectable through the third shifting element K3 designed as a clutch and through the seventh shaft 7 to the idler gear 15A of the second spur gear stage ST2.

Moreover, with the fourth design variant, the planetary gear carrier PT1 of the first planetary gear set RS1 is connectable through the fourth shaft 4 and through the sixth shifting element B2 designed as a brake to the housing 11. The fixed gear 12 of the first spur gear stage ST1 is connected through the fifth shaft 5 to the ring gear HR1 of the first planetary gear set RS1, whereas the fixed gear 12 of the first spur gear stage ST1 and the ring gear HR1 of the first planetary gear set RS1 are connectable through the fifth shaft 5 to the second shifting element K2 designed as a clutch and through the eighth shaft 8 to the planetary gear carrier PT3 of the third planetary gear set RS3. Finally, the fixed gear 14 of the second spur gear stage ST2 is connected through the sixth shaft 6 to the ring gear HR2 of the second planetary gear set RS2.

Figure 4A:
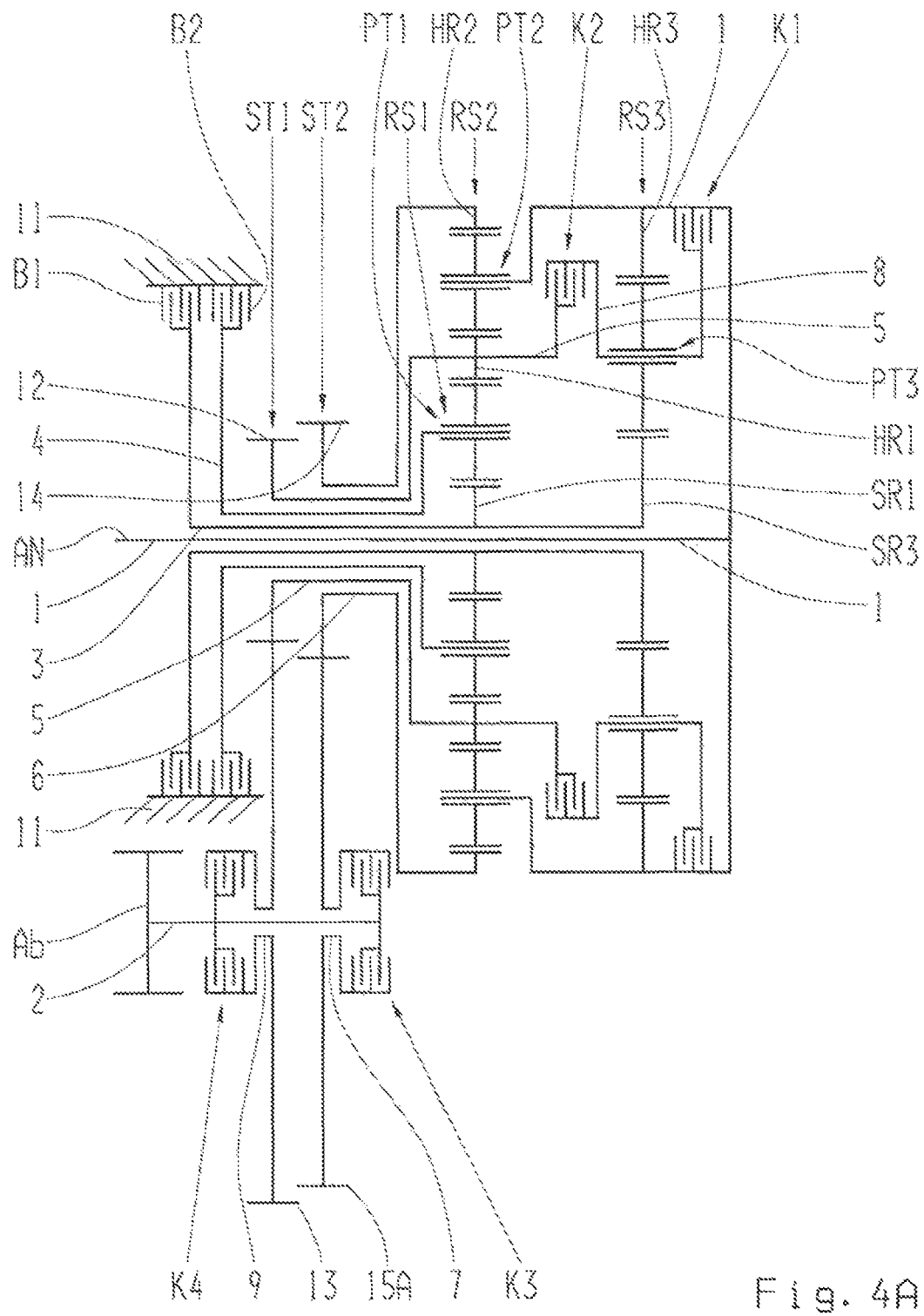
FIG. 4A is a schematic view of a first blocking variant for the fourth design variant in accordance with FIG. 4.

FIG. 4A shows a first blocking variant for the fourth design variant of the multi-speed transmission in accordance with the invention shown in FIG. 4. With the variant shown in FIG. 4, for the blocking of the third planetary gear set RS3, the ring gear HR3 is connected to the sun gear SR3 of the third planetary gear set RS3 through the first shifting element K1 designed as a clutch. By contrast, with the variant in accordance with FIG. 4A, the ring gear HR3 is connected through the first shifting element K1 designed as a clutch to the planetary gear carrier PT3 or the bar of the third planetary gear set RS3.

Specifically, with the variant shown in FIG. 4A, it is provided that the first shaft 1 is connected to the planetary gear carrier PT2 of the second planetary gear set RS2 and to the ring gear HR3 of the third planetary gear set RS3. In addition, the first shaft 1 is connectable through the first shifting element K1 designed as a clutch and through the eighth shaft 8 to the planetary gear carrier PT3 of the third planetary gear set RS3. Furthermore, the second shaft 2 is connectable through the fourth shifting element K4 designed as a clutch and through the ninth gear 9 to the idler gear 13 of the first spur gear stage ST1. In addition, the second shaft 2 is connectable through the third shifting element K3 designed as a clutch and through the seventh shaft 7 to the idler gear 15A of the second spur gear stage ST2.

Furthermore, with the first blocking variant in accordance with FIG. 4A, the sun gear SR1 of the first planetary gear set RS1 and the sun gear SR3 of the third planetary gear set RS3 are connectable through the third shaft 3 and through the fifth shifting element B1 designed as a brake to the housing 11. The planetary gear carrier PT1 of the first planetary gear set RS1 is connected through the fourth shaft 4 and through the sixth shifting element B2 designed as a brake to the housing 11. In addition, the fixed gear 12 of the first spur gear stage ST1 is connected through the fifth shaft 5 to the ring gear HR1 of the first planetary gear set RS1, whereas the fixed gear 12 of the first spur gear stage ST1 and the ring gear HR1 of the first spur gear stage RS1 are connectable through the fifth shaft 5 and through the second shifting element K2 designed as a clutch, and through the eighth shaft 8, to the planetary gear carrier PT3 of the third planetary gear set RS3. Finally, the fixed gear 14 of the second spur gear stage ST2 is connected through the sixth shaft 6 to the ring gear HR2 of the second planetary gear set RS2.

Figure 4B:
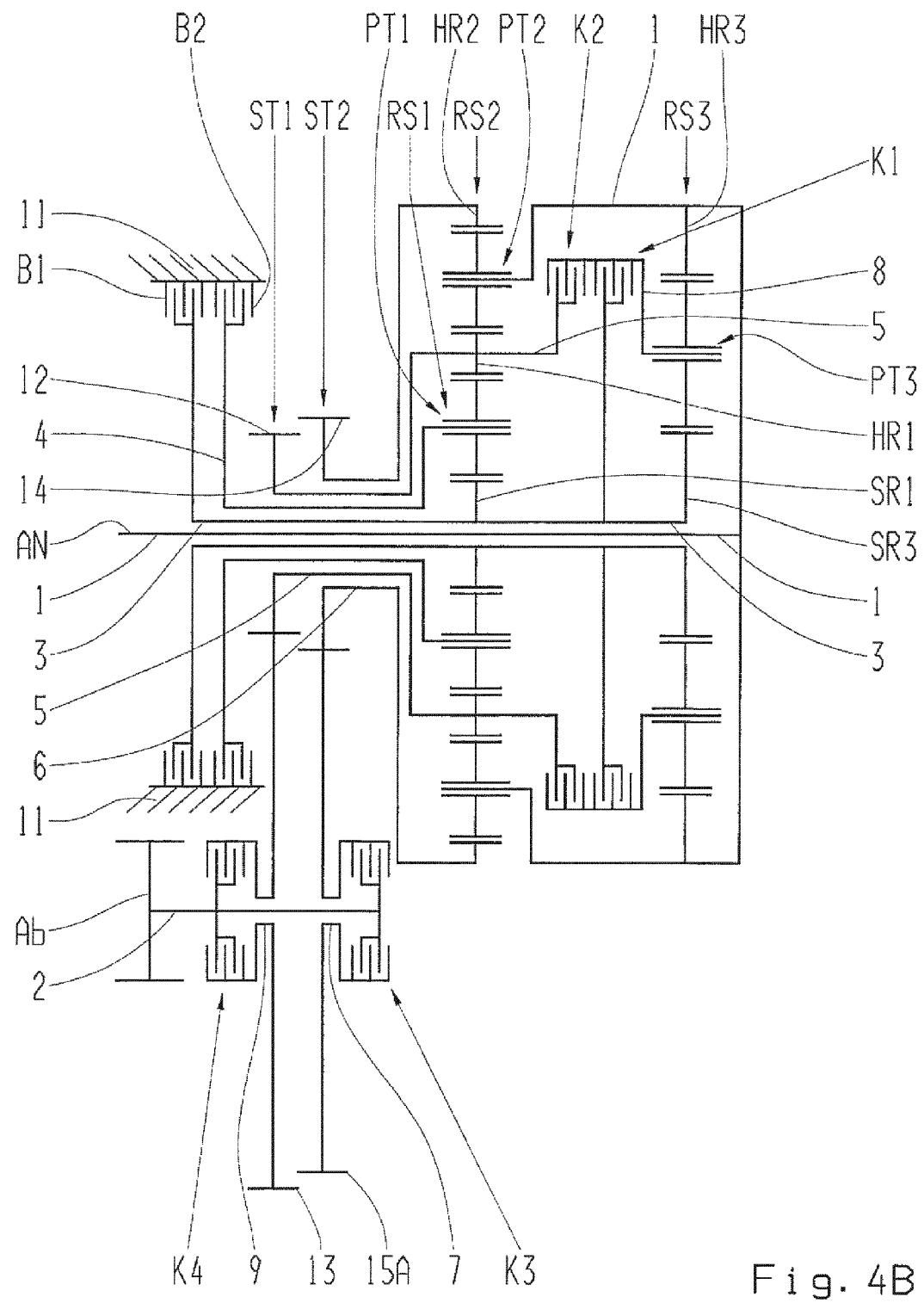
FIG. 4B is a schematic view of a second blocking variant for the fourth design variant in accordance with FIG. 4.

FIG. 4B shows a second blocking variant with respect to the fourth design variant of the multi-speed transmission. With the second blocking variant, through the first shifting element K1 designed as a clutch, the planetary gear carrier PT3 and the sun gear SR3 of the third planetary gear set RS3 are connected to each other. Specifically, it is provided that the first shaft 1 is connected to the planetary gear carrier PT2 of the second planetary gear set RS2 and to the ring gear HR3 of the third planetary gear set RS3. The second shaft 2 is connectable through the fourth shifting element K4 designed as a clutch and through the ninth shaft 9 to the idler gear 13 of the first spur gear stage ST1. In addition, the second shaft 2 is connected through the third shifting element K3 designed as a clutch and through the seventh shaft 7 to the idler gear 15A of the second spur gear stage ST2.

Moreover, it is provided with the second blocking variant that the sun gear SR1 of the first planetary gear set RS1 and the sun gear SR3 of the third planetary gear set RS3 are connectable through the third shaft 3 and the fifth shifting element B1 designed as a brake to the housing 11, whereas the sun gear SR1 of the first planetary gear set RS1 and the sun gear SR3 of the third planetary gear set RS3 are connectable through the third shaft 3 and the first shifting element K1 designed as a clutch, and through the eighth shaft 8, to the planetary gear carrier PT3 of the third planetary gear set RS3 and whereas the sun gear SR1 of the first planetary gear set RS1 and the sun gear SR3 of the third planetary gear set RS3 are connectable through the third shaft 3 and through the first shifting element K1 designed as a clutch, and through the eighth shaft 8 and the second shifting element K2 designed as a clutch, and through the fifth shaft 5, to the ring gear HR1 of the first planetary gear set RS1. In addition, the planetary gear carrier PT1 of the first planetary gear set RS1 is connectable through the fourth shaft 4 and through the sixth shifting element B2 designed as a brake to the housing 11. The fixed gear 12 of the first spur gear stage ST1 is connected through the fifth shaft 5 to the ring gear HR1 of the first planetary gear set RS1, whereas the fixed gear 12 of the first spur gear stage ST1 and the ring gear HR1 of the first spur gear stage RS1 are connectable through the fifth shaft 5 and through the second shifting element K2 designed as a clutch, and through the eighth shaft 8, to the planetary gear carrier PT3 of the third planetary gear set RS3. Finally, the fixed gear 14 of the second spur gear stage ST2 is connected through the sixth shaft 6 to the ring gear HR2 of the second planetary gear set RS2.

With the fifth design variant in accordance with FIG. 5, is provided that the first shaft 1 is connectable through the first shifting element K1 designed as a clutch and through the third shaft 3 to the sun gear SR1 of the first planetary gear set RS1 and to the sun gear SR3 of the third planetary gear set RS3, whereas the sun gear SR1 of the first planetary gear set RS1 and the sun gear SR3 of the third planetary gear set RS3 are connectable through the third shaft 3 and through the fifth shifting element B1 designed as a brake to the housing 11. The first shaft 1 is connected to the planetary gear carrier PT2 of the second planetary gear set RS2. In addition, the first shaft 1 is connectable through the second shifting element K2 designed as a clutch and through the eighth shaft 8 to the ring gear HR3 of the third planetary gear set RS3. Furthermore, the second shaft 2 is connected to the fixed gear 13A of the first spur gear stage ST1 and to the fixed gear 15 of the second spur gear stage ST2.

In addition, it is provided with the fifth design variant that the planetary gear carrier PT1 of the first planetary gear set RS1 is connectable through the fourth shaft 4 and through the sixth shifting element B2 designed as a brake to the housing 11. Furthermore, the idler gear 12A of the first spur gear stage ST1 is connectable through the fifth shaft 5 and through the fourth shifting element K4 designed as a clutch, and through the ninth shaft 9, to the ring gear HR1 of the first planetary gear set RS1 and to the planetary gear carrier PT3 of the third planetary gear set RS3. In addition, the idler gear 14A of the second spur gear stage ST2 is connectable through the sixth shaft 6 and through the third shifting element K3 designed as a clutch, and through the seventh shaft 7, to the ring gear HR2 of the second planetary gear set RS2.

For the presented equally effective design variants, FIG. 6 shows an example of a shifting diagram or a shifting matrix, as the case may be, for the transmission variants. In the shifting diagram, for the realization of the various gears, shifting elements K1, K2, K3, K4, B1, B2 to be locked or activated, as the case may be, are shown in table form, whereas a transmission ratio i is indicated for each gear and the respective gear jump φ is indicated between different gears. In addition to the nine forward gears G1, G2, G3, G4, G5, G6, G7, G8, G9 and the specified reverse gear R, additional shifting combinations are indicated as alternative fourth forward gears M1, M2, M3. As a whole, it also arises from the shifting diagram that the proposed multi-speed transmission features optimized transmission ratio sequences with low absolute and relative rotational speeds and low torques for the planetary gear sets and shifting elements. In addition, good degrees of toothing efficiency and low drag torques arise from the selected arrangements of the gear sets.

As preferred stationary transmission ratios, a value of approximately $i_0=-1.920$ can be used for the first planetary gear set RS1, a value of approximately $i_0=-1.650$ can be used for the second planetary gear set RS2, and a value of approximately $i_0=-1.750$ can be used for the third planetary gear set RS3. As the stationary transmission ratio, a value of approximately $i_{ST1}=-1.666$ is selected for the first spur gear stage ST1, and a value of approximately $i_{ST2}=-1.000$ is selected for the second spur gear stage ST2. Moreover, it arises from the shifting diagram that, for shifting gears, each of the only three shifting elements is locked.

Specifically, it arises from the shifting diagram in accordance with FIG. 6 that, for the realization of the first forward gear G1, the second shifting element K2 designed as a clutch, the fourth shifting element K4 designed as a clutch, and the sixth shifting element B2 designed as a brake are locked. For the shifting of the second forward gear G2, the second shifting element K2 designed as a clutch, the fourth shifting element K4 designed as a clutch and the fifth shifting element B1 designed as a brake are locked. For the shifting of the third forward gear G3, the first shifting element K1 designed as a clutch, the second shifting element K2 designed as a clutch and the fourth shifting element K4 designed as a clutch are locked. For the shifting of the fourth forward gear G4, the second shifting element K2 designed as a clutch, the third shifting element K3 designed as a clutch and the fourth shifting element K4 designed as a clutch are locked. For the shifting of the fifth forward gear G5, the first shifting element K1 designed as a clutch, the second shifting element K2 designed as a clutch and the third shifting element K3 designed as a clutch are locked. For the shifting of the sixth forward gear G6, the second shifting element K2 designed as a clutch, the third shifting element K3 designed as a clutch and the fifth shifting element B1 designed as a brake are locked. For the shifting of the seventh forward gear G7, the second shifting element K2 designed as a clutch, the third shifting element K3 designed as a clutch and the sixth shifting element B2 designed as a brake are locked. For the shifting of the eighth forward gear G8, the third shifting element K3 designed as a clutch, the fifth shifting element B1 designed as a brake and the sixth shifting element B2 designed as a brake are locked. For the shifting of the ninth forward gear G9, the first shifting element K1 designed as a clutch, the third shifting element K3 designed as a clutch and the sixth shifting element B2 designed as a brake are locked. Finally, for the shifting of the reverse gear R, the first shifting element K1 designed as a clutch, the fourth shifting element K4 designed as a clutch and the sixth shifting element B2 designed as a brake are locked.

With respect to the shifting combinations of the alternative fourth forward gears M1, M2, M3, it is provided that, for the shifting of the alternative fourth forward gear M1, the third shifting element K3 designed as a clutch, the fourth shifting element K4 designed as a clutch and the sixth shifting element B2 designed as a brake are locked. Furthermore, for the shifting of the alternative fourth forward gear M2, the first shifting element K1 designed as a clutch, the third shifting element K3 designed as a clutch and the fourth shifting element K4 designed as a clutch are locked. For the shifting of the alternative fourth forward gear M3, the third shifting element K3 designed as a clutch, the fourth shifting element K4 designed as a clutch and the fifth shifting element B1 designed as a brake are locked.

Modifications and variations can be made to the embodiments illustrated or described herein without departing from the scope and spirit of the invention as set forth in the appended claims.

The invention claimed is:

1. A multi-speed transmission in planetary design for a vehicle, comprising:
    a housing (11);
    a first shaft (1) provided as a drive (AN), and a second shaft (2) provided as an output (Ab) axially parallel to the drive (AN);
    three planetary gear sets (RS1, RS2, RS3), a plurality of additional shafts (3, 4, 5, 6, 7, 8, 9), and six shifting elements (K1, K2, K3, K4, B1, B2) through which actuation of a plurality of gears are realized;
    first and second machine elements (ST1, ST2) that transfer torque between the drive (AN) and the output (Ab), wherein the first and second machine elements comprise first and second spur gear stages (ST1, ST2);
    the first shaft (1), as an input (AN), connected or connectable to a ring gear (HR3) of the third planetary gear set (RS3) and to a planetary gear carrier (PT2) of the second planetary gear set (RS2);
    the second shaft (2), as an output (Ab), connectable or connected to the first machine element (ST1) and to the second machine element (ST2)
    a planetary gear carrier (PT1) of the first planetary gear set (RS1) is connectable through the fourth shaft (4) and through the sixth shifting element (B2) designed as a brake to the housing (11);
    a fixed gear (12) of the first spur gear stage (ST1) is connected through the fifth shaft (5) to a ring gear (HR1) of the first planetary gear set (RS1) and to a planetary gear carrier (PT3) of the third planetary gear set (RS3); and
    a fixed gear (14) of the second spur gear stage (ST2) is connected through the sixth shaft (6) to a ring gear (HR2) of the second planetary gear set (RS2).

2. The multi-speed transmission according to claim 1, wherein:
    the first shaft (1) is connectable through the first shifting element (K1) designed as a clutch and through the third shaft (3) to a sun gear (SR1) of the first planetary gear set (RS1) and a sun gear (SR3) of the third planetary gear set (RS3);
    the sun gear (SR1) of the first planetary gear set (RS1) and the sun gear (SR3) of the third planetary gear set (RS3) are connectable through the third shaft (3) and through the fifth shifting element (B1) designed as a brake to the housing (11);
    the first shaft (1) is connectable through the second shifting element (K2) designed as a clutch and through the eighth shaft (8) to the ring gear (HR3) of the third planetary gear set (RS3);
    the first shaft (1) is connectable through the third shifting element (K3) designed as a clutch and through the seventh shaft (7) to the planetary gear carrier (PT2) of the second planetary gear set (RS2);
    the second shaft (2) is connectable through the fourth shifting element (K4) designed as a clutch and through the ninth shaft (9) to an idler gear (13) of the first spur gear stage (ST1); and
    the second shaft (2) is connected to a second fixed gear (15) of the second spur gear stage (ST2).

3. The multi-speed transmission according to claim 1, wherein:
    the first shaft (1) is connectable through the first shifting element (K1) designed as a clutch and through the third shaft (3) to a sun gear (SR1) of the first planetary gear set (RS1) and to a sun gear (SR3) of the third planetary gear set (RS3);
    the sun gear (SR1) of the first planetary gear set (RS1) and the sun gear (SR3) of the third planetary gear set (RS3) are connectable through the third shaft (3) and through the fifth shifting element (B1) designed as a brake to the housing (11);
    the first shaft (1) is connected to the planetary gear carrier (PT2) of the second planetary gear set (RS2);
    the first shaft (1) is connectable through the second shifting element (K2) designed as a clutch and through the eighth shaft (8) to the ring gear (HR3) of the third planetary gear set (RS3);
    the second shaft (2) is connectable through the fourth shifting element (K4) designed as a clutch and through the ninth shaft (9) to an idler gear (13) of the first spur gear stage (ST1); and
    the second shaft (2) is connectable through the third shifting element (K3) designed as a clutch and through the seventh shaft (7) to an idler gear (15A) of the second spur gear stage (ST2).

4. The multi-speed transmission according to claim 1, wherein at least two of the planetary gear sets (RS1, RS2, RS3) are arranged radially one above the other.

5. The multi-speed transmission according to claim 4, wherein:
the first planetary gear set (RS1) and the second planetary set (RS2) are arranged radially one after the other; and
the first planetary gear set (RS1) is arranged radially inwardly and the second planetary set (RS2) is arranged radially outwardly, the first planetary gear set and the second planetary gear set connected to each other through the ring gear (HR1) of the first planetary gear set (RS1).

6. The multi-speed transmission according to claim 1, wherein the transmission comprises at least nine forward gears (G1 to G9) and at least one reverse gear (R).

7. The multi-speed transmission according to claim 6, wherein the shifting elements (K1, K2, K3, K4, B1, B2) are designed as frictional-locking or positive-locking shifting elements.

8. The multi-speed transmission according to claim 7, wherein:
for shifting of the first forward gear (G1), the second shifting element (K2) designed as a clutch, the fourth shifting element (K4) designed as a clutch, and the sixth shifting element (B2) designed as a brake are locked;
for shifting of the second forward gear (G2), the second shifting element (K2) designed as a clutch, the fourth shifting element (K4) designed as a clutch and the fifth shifting element (B1) designed as a brake are locked;
for shifting of the third forward gear (G3), the first shifting element (K1) designed as a clutch, the second shifting element (K2) designed as a clutch and the fourth shifting element (K4) designed as a clutch are locked;
for shifting of the fourth forward gear (G4), the second shifting element (K2) designed as a clutch, the third shifting element (K3) designed as a clutch and the fourth shifting element (K4) designed as a clutch are locked;
for shifting of the fifth forward gear (G5), the first shifting element (K1) designed as a clutch, the second shifting element (K2) designed as a clutch and the third shifting element (K3) designed as a clutch are locked;
for shifting of the sixth forward gear (G6), the second shifting element (K2) designed as a clutch, the third shifting element (K3) designed as a clutch and the fifth shifting element (B1) designed as a brake are locked;
for shifting of the seventh forward gear (G7), the second shifting element (K2) designed as a clutch, the third shifting element (K3) designed as a clutch and the sixth shifting element (B2) designed as a brake are locked;
for shifting of the eighth forward gear (G8), the third shifting element (K3) designed as a clutch, the fifth shifting element (B1) designed as a brake and the sixth shifting element (B2) designed as a brake are locked;
for shifting of the ninth forward gear (G9), the first shifting element (K1) designed as a clutch, the third shifting element (K3) designed as a clutch and the sixth shifting element (B2) designed as a brake are locked; and
for shifting of the reverse gear (R), the first shifting element (K1) designed as a clutch, the fourth shifting element (K4) designed as a clutch and the sixth shifting element (B2) designed as a brake are locked.

9. The multi-speed transmission according to claim 8, wherein for shifting of alternative fourth forward gears (M1, M2, M3):
third shifting element (K3) designed as a clutch, the fourth shifting element (K4) designed as a clutch and the sixth shifting element (B2) designed as a brake are locked; or
the first shifting element (K1) designed as a clutch, the third shifting element (K3) designed as a clutch and the fourth shifting element (K4) designed as a clutch are locked; or
the third shifting element (K3) designed as a clutch, the fourth shifting element (K4) designed as a clutch and the fifth shifting element (B1) designed as a brake are locked.

10. A multi-speed transmission in planetary design for a vehicle, comprising:
a housing (11);
a first shaft (1) provided as a drive (AN), and a second shaft (2) provided as an output (Ab) axially parallel to the drive (AN);
three planetary gear sets (RS1, RS2, RS3), a plurality of additional shafts (3, 4, 5, 6, 7, 8, 9), and six shifting elements (K1, K2, K3, K4, B1, B2) through which actuation of a plurality of gears are realized;
first and second machine elements (ST1, ST2) that transfer torque between the drive (AN) and the output (Ab), wherein the first and second machine elements comprise first and second spur gear stages (ST1, ST2);
the first shaft (1), as an input (AN), connected or connectable to a ring gear (HR3) of the third planetary gear set (RS3) and to a planetary gear carrier (PT2) of the second planetary gear set (RS2);
the second shaft (2), as an output (Ab), connectable or connected to the first machine element (ST1) and to the second machine element (ST2);
a planetary gear carrier (PT1) of the first planetary gear set (RS1) is connectable through the fourth shaft (4) and through the sixth shifting element (B2) designed as a brake to the housing (11);
a fixed gear (12) of the first spur gear stage (ST1) is connected through the fifth shaft (5) to a ring gear (HR1) of the first planetary gear set (RS1);
the fixed gear (12) of the first spur gear stage (ST1) and the ring gear (HR1) of the first planetary gear set (RS1) are connectable through the fifth shaft (5) and through the second shifting element (K2) designed as a clutch, and through the eighth shaft (8), to a planetary gear carrier (PT3) of the third planetary gear set (RS3); and
a fixed gear (14) of the second spur gear stage (ST2) is connected through the sixth shaft (6) to a ring gear (HR2) of the second planetary gear set (RS2).

11. The multi-speed transmission according to claim 10, wherein:
the first shaft (1) is connectable through the first shifting element (K1) designed as a clutch and through the third shaft (3) to a sun gear (SR1) of the first planetary gear set (RS1) and to a sun gear (SR3) of the third planetary gear set (RS3);
the sun gear (SR1) of the first planetary gear set (RS1) and the sun gear (SR3) of the third planetary gear set (SR3) are connectable through the third shaft (3) and through the fifth shifting element (B1) designed as a brake to the housing (11);
the first shaft (1) is connected to the ring gear (HR3) of the third planetary gear set (RS3);
the first shaft (1) is connectable through the third shifting element (K3) designed as a clutch and through the seventh shaft (7) to the planetary gear carrier (PT2) of the second planetary gear set (RS2);

the second shaft (2) is connectable through the fourth shifting element (K4) designed as a clutch and through the ninth shaft (9) to an idler gear (13) of the first spur gear stage (ST1); and the second shaft (2) is connected to a second fixed gear (15) of the second spur gear stage (ST2).

12. The multi-speed transmission according to claim 10, wherein:

the first shaft (1) is connected to a ring gear (HR3) of the third planetary gear set (RS3);

the first shaft (1) is connectable through the first shifting element (K1) designed as a clutch and through the eighth shaft (8) to a planetary gear carrier (PT3) of the third planetary gear set (RS3);

the first shaft (1) is connectable through the third shifting element (K3) designed as a clutch and through the seventh shaft (7) to the planetary gear carrier (PT2) of the second planetary gear set (RS2);

the second shaft (2) is connectable through the fourth shifting element (K4) designed as a clutch and through the ninth shaft (9) to an idler gear (13) of the first spur gear stage (ST1); and the second shaft (2) is connected to a second fixed gear (15) of the second spur gear stage (ST2).

13. The multi-speed transmission according to claim 12, wherein:

a sun gear (SR1) of the first planetary gear set (RS1) and a sun gear (SR3) of the third planetary gear set (RS3) are connectable through the third shaft (3) and the fifth shifting element (B1) designed as a brake to the housing (11).

14. The multi-speed transmission according to claim 10, wherein:

the first shaft (1) is connected to the ring gear (HR3) of the third planetary gear set (RS3);

the first shaft (1) is connectable through the third shifting element (K3) designed as a clutch and through the seventh shaft (7) to the planetary gear carrier (PT2) of the second planetary gear set (RS2);

the second shaft (2) is connectable through the fourth shifting element (K4) designed as a clutch and through the ninth shaft (9) to an idler gear (13) of the first spur gear stage (ST1); and the second shaft (2) is connected to a second fixed gear (15) of the second spur gear stage (ST2).

15. The multi-speed according to claim 14, wherein:

a sun gear (SR1) of the first planetary gear set (RS1) and a sun gear (SR3) of the third planetary gear set (RS3) are connectable through the third shaft (3) and through the fifth shifting element (B1) designed as a brake to the housing (11);

the sun gear (SR1) of the first planetary gear set (RS1) and the sun gear (SR3) of the third planetary gear set (RS3) are connectable through the third shaft (3) and through the first shifting element (K1) designed as a clutch, and through the eighth shaft (8), to a planetary gear carrier (PT3) of the third planetary gear set (RS3); and the sun gear (SR1) of the first planetary gear set (RS1) and the sun gear (SR3) of the third planetary gear (RS3) are connectable through the third shaft (3) and through the first shifting element (K1) designed as a clutch, and through the eighth shaft (8) and through the second shifting element (K2) designed as a clutch, and through the fifth shaft (5), to a ring gear (HR1) of the first planetary gear set (RS1).

16. The multi-speed transmission according to claim 10, wherein:

the first shaft (1) is connectable through the first shifting element (K1) designed as a clutch and through the third shaft (3) to a sun gear (SR1) of the first planetary gear set (RS1) and a sun gear (SR3) of the third planetary gear set (RS3);

the sun gear (SR1) of the first planetary gear set (RS1) and the sun gear (SR3) of the third planetary gear set (RS3) are connectable through the third shaft (3) and through the fifth shifting element (B1) designed as a brake to the housing (11);

the first shaft (1) is connected to the ring gear (HR3) of the third planetary gear set (RS3) and to the planetary gear carrier (PT2) of the second planetary gear set (RS2);

the second shaft (2) is connectable through the fourth shifting element (K4) designed as a dutch and through the ninth shaft (9) to an idler gear (13) of the first spur gear stage (ST1); and the second shaft (2) is connectable through the third shifting element (K3) designed as a clutch and through the seventh shaft (7) to an idler gear (15A) of the second spur gear stage (ST2).

17. The multi-speed transmission according to claim 10, wherein:

the first shaft (1) is connected to the planetary gear carrier (PT2) of the second planetary gear set (RS2) and to the ring gear (HR3) of the third planetary gear set (RS3);

the first shaft (1) is connectable through the first shifting element (K1) designed as a clutch and through the eighth shaft (8) to a planetary gear carrier (PT3) of the third planetary gear set (RS3);

the second shaft (2) is connectable through the fourth shifting element (K4) designed as a clutch and through the ninth shaft (9) to an idler gear (13) of the first spur gear stage (ST1); and the second shaft (2) is connectable through the third shifting element (K3) designed as a clutch and through the seventh shaft (7) to an idler gear (15A) of the second spur gear stage (ST2).

18. The multi-speed transmission according to claim 17, wherein:

a sun gear (SR1) of the first planetary gear set (RS1) and a sun gear (SR3) of the third planetary gear set (RS3) are connectable through the third shaft (3) and through the fifth shifting element (B1) designed as a brake to the housing (11).

19. The multi-speed transmission according to claim 10, wherein:

the first shaft (1) is connected to the planetary gear carrier (PT2) of the second planetary gear set (RS2) and to the ring gear (HR3) of the third planetary gear set (RS3);

the second shaft (2) is connectable through the fourth shifting element (K4) designed as a clutch and through the ninth shaft (9) to an idler gear (13) of the first spur gear stage (ST1); and the second shaft (2) is connectable through the third shifting element (K3) designed as a clutch and through the seventh shaft (7) to an idler gear (15A) of the second spur gear stage (ST2).

20. The multi-speed transmission according to claim 19, wherein:

a sun gear (SR1) of the first planetary gear set (RS1) and a sun gear (SR3) of the third planetary gear set (RS3) are connectable through the third shaft (3) and through the fifth shifting element (B1) designed as a brake to the housing (11);

the sun gear (SR1) of the first planetary gear set (RS1) and the sun gear (SR3) of the third planetary gear set (RS3) are connectable through the third shaft (3) and through the first shifting element (K1) designed as a clutch, and through the eighth shaft (8), to a planetary gear carrier (PT3) of the third planetary gear set (RS3);

the sun gear (SR1) of the first planetary gear set (RS1) and the sun gear (SR3) of the third planetary gear (RS3) are connectable through the third shaft (3) and through the first shifting element (K1) designed as a clutch, and through the eighth shaft (8) and through the second shifting element (K2) designed as a clutch, and through the fifth shaft (5), to a ring gear (HR1) of the first planetary gear set (RS1).

21. The multi-speed transmission according to claim 10, wherein at least two of the planetary gear sets (RS1, RS2, RS3) are arranged radially one above the other.

22. The multi-speed transmission according to claim 21, wherein:
the first planetary gear set (RS1) and the second planetary set (RS2) are arranged radially one after the other; and
the first planetary gear set (RS1) is arranged radially inwardly and the second planetary set (RS2) is arranged radially outwardly, the first planetary gear set and the second planetary set connected to each other through the ring gear (HR1) of the first planetary gear set (RS1).

23. The multi-speed transmission according to claim 10, wherein the transmission comprises at least nine forward gears (G1 to G9) and at least one reverse gear (R).

24. The multi-speed transmission according to claim 6, wherein the shifting elements (K1, K2, K3, K4, B1, B2) are designed as frictional-locking or positive-locking shifting elements.

25. The multi-speed transmission according to claim 7, wherein:
for shifting of the first forward gear (G1), the second shifting element (K2) designed as a clutch, the fourth shifting element (K4) designed as a clutch, and the sixth shifting element (B2) designed as a brake are locked;
for shifting of the second forward gear (G2), the second shifting element (K2) designed as a clutch, the fourth shifting element (K4) designed as a clutch and the fifth shifting element (B1) designed as a brake are locked;
for shifting of the third forward gear (G3), the first shifting element (K1) designed as a clutch, the second shifting element (K2) designed as a clutch and the fourth shifting element (K4) designed as a clutch are locked;
for shifting of the fourth forward gear (G4), the second shifting element (K2) designed as a clutch, the third shifting element (K3) designed as a clutch and the fourth shifting element (K4) designed as a clutch are locked;
for shifting of the fifth forward gear (G5), the first shifting element (K1) designed as a clutch, the second shifting element (K2) designed as a clutch and the third shifting element (K3) designed as a clutch are locked;
for shifting of the sixth forward gear (G6), the second shifting element (K2) designed as a clutch, the third shifting element (K3) designed as a clutch and the fifth shifting element (B1) designed as a brake are locked;
for shifting of the seventh forward gear (G7), the second shifting element (K2) designed as a clutch, the third shifting element (K3) designed as a clutch and the sixth shifting element (B2) designed as a brake are locked;

for shifting of the eighth forward gear (G8), the third shifting element (K3) designed as a clutch, the fifth shifting element (B1) designed as a brake and the sixth shifting element (B2) designed as a brake are locked;

for shifting of the ninth forward gear (G9), the first shifting element (K1) designed as a clutch, the third shifting element (K3) designed as a clutch and the sixth shifting element (B2) designed as a brake are locked; and for shifting of the reverse gear (R), the first shifting element (K1) designed as a clutch, the fourth shifting element (K4) designed as a clutch and the sixth shifting element (B2) designed as a brake are locked.

26. The multi-speed transmission according to claim 8, wherein for shifting of alternative fourth forward gears (M1, M2, M3):
third shifting element (K3) designed as a clutch, the fourth shifting element (K4) designed as a clutch and the sixth shifting element (B2) designed as a brake are locked; or
the first shifting element (K1) designed as a clutch, the third shifting element (K3) designed as a clutch and the fourth shifting element (K4) designed as a clutch are locked; or
the third shifting element (K3) designed as a clutch, the fourth shifting element (K4) designed as a clutch and the fifth shifting element (B1) designed as a brake are locked.

27. A multi-speed transmission in planetary design for a vehicle, comprising:
a housing (11);
a first shaft (1) provided as a drive (AN), and a second shaft (2) provided as an output (Ab) axially parallel to the drive (AN);
three planetary gear sets (RS1, RS2, RS3), a plurality of additional shafts (3, 4, 5, 6, 7, 8, 9), and six shifting elements (K1, K2, K3, K4, B1, B2) through which actuation of a plurality of gears are realized;
first and second machine elements (ST1, ST2) that transfer torque between the drive (AN) and the output (Ab), wherein the first and second machine elements comprise first and second spur gear stages (ST1, ST2);
the first shaft (1), as an input (AN), connected or connectable to a ring gear (HR3) of the third planetary gear set (RS3) and to a planetary gear carrier (PT2) of the second planetary gear set (RS2);
the second shaft (2), as an output (Ab), connectable or connected to the first machine element (ST1) and to the second machine element (ST2);
the first shaft (1) is connectable through the first shifting element (K1) designed as a clutch and through the third shaft (3) to a sun gear (SR1) of the first planetary gear set (RS1) and a sun gear (SR3) of the third planetary gear set (RS3);
the sun gear (SR1) of the first planetary gear set (RS1) and the sun gear (SR3) of the third planetary gear set (RS3) are connectable through the third shaft (3) and through the fifth shifting element (B1) designed as a brake to the housing (11);
the first shaft (1) is connected to the planetary gear carrier (PT2) of the second planetary gear set (RS2);
the first shaft (1) is connectable through the second shifting element (K2) designed as a clutch and through the eighth shaft (8) to the ring gear (HR3) of the third planetary gear set (RS3); and
the second shaft (2) is connected to a fixed gear (13A) of the first spur gear stage (ST1) and to a fixed gear (15) of the second spur gear stage (ST2).

28. The multi-speed transmission according to claim 27, wherein:
- a planetary gear carrier (PT1) of the first planetary gear set (RS1) is connectable through the fourth shaft (4) and through the sixth shifting element (B2) designed as a brake to the housing (11);
- an idler gear (12A) of the first spur gear stage (ST1) is connectable through the fifth shaft (5) and through the fourth shifting element (K4) designed as a clutch, and through the ninth shaft (9), to a ring gear (HR1) of the first planetary gear set (RS1) and to a planetary gear carrier (PT3) of the third planetary gear set (RS3); and
- an idler gear (14A) of the second spur gear stage (ST2) is connectable through the sixth shaft (6) and through the third shifting element (K3) designed as a clutch, and through the seventh shaft (7), to a ring gear (HR2) of the second planetary gear set (RS2).

29. The multi-speed transmission according to claim 27, wherein at least two of the planetary gear sets (RS1, RS2, RS3) are arranged radially one above the other.

30. The multi-speed transmission according to claim 29, wherein:
- the first planetary gear set (RS1) and the second planetary set (RS2) are arranged radially one after the other; and
- the first planetary gear set (RS1) arranged radially inwardly and the second planetary set (RS2) arranged radially outwardly are connected to each other through a ring gear (HR1) of the first planetary gear set (RS1).

31. The multi-speed transmission according to claim 27, wherein the transmission comprises at least nine forward gears (G1 to G9) and at least one reverse gear (R).

32. The multi-speed transmission according to claim 31, wherein the shifting elements (K1, K2, K3, K4, B1, B2) are designed as frictional-locking or positive-locking shifting elements.

33. The multi-speed transmission according to claim 32, wherein:
- for shifting of the first forward gear (G1), the second shifting element (K2) designed as a clutch, the fourth shifting element (K4) designed as a clutch, and the sixth shifting element (B2) designed as a brake are locked;
- for shifting of the second forward gear (G2), the second shifting element (K2) designed as a clutch, the fourth shifting element (K4) designed as a clutch and the fifth shifting element (B1) designed as a brake are locked;
- for shifting of the third forward gear (G3), the first shifting element (K1) designed as a clutch, the second shifting element (K2) designed as a clutch and the fourth shifting element (K4) designed as a clutch are locked;
- for shifting of the fourth forward gear (G4), the second shifting element (K2) designed as a clutch, the third shifting element (K3) designed as a clutch and the fourth shifting element (K4) designed as a clutch are locked;
- for shifting of the fifth forward gear (G5), the first shifting element (K1) designed as a clutch, the second shifting element (K2) designed as a clutch and the third shifting element (K3) designed as a clutch are locked;
- for shifting of the sixth forward gear (G6), the second shifting element (K2) designed as a clutch, the third shifting element (K3) designed as a clutch and the fifth shifting element (B1) designed as a brake are locked;
- for shifting of the seventh forward gear (G7), the second shifting element (K2) designed as a clutch, the third shifting element (K3) designed as a clutch and the sixth shifting element (B2) designed as a brake are locked;
- for shifting of the eighth forward gear (G8), the third shifting element (K3) designed as a clutch, the fifth shifting element (B1) designed as a brake and the sixth shifting element (B2) designed as a brake are locked;
- for shifting of the ninth forward gear (G9), the first shifting element (K1) designed as a clutch, the third shifting element (K3) designed as a clutch and the sixth shifting element (B2) designed as a brake are locked; and
- for shifting of the reverse gear (R), the first shifting element (K1) designed as a clutch, the fourth shifting element (K4) designed as a clutch and the sixth shifting element (B2) designed as a brake are locked.

34. The multi-speed transmission according to claim 33, wherein for shifting of alternative fourth forward gears (M1, M2, M3):
- third shifting element (K3) designed as a clutch, the fourth shifting element (K4) designed as a clutch and the sixth shifting element (B2) designed as a brake are locked; or
- the first shifting element (K1) designed as a clutch, the third shifting element (K3) designed as a clutch and the fourth shifting element (K4) designed as a clutch are locked; or
- the third shifting element (K3) designed as a clutch, the fourth shifting element (K4) designed as a clutch and the fifth shifting element (B1) designed as a brake are locked.

* * * * *